(12) United States Patent
Avirneni et al.

(10) Patent No.: US 10,003,567 B1
(45) Date of Patent: Jun. 19, 2018

(54) SYSTEMS AND METHODS FOR PROVIDING DNS SERVICES

(71) Applicant: Nominum, Inc., Redwood City, CA (US)

(72) Inventors: Srinivas Avirneni, Austin, TX (US); Keith Oborn, Bramley (GB)

(73) Assignee: Nominum, Inc., Redwood City, CA (US)

( * ) Notice: Subject to any disclaimer, the term of this patent is extended or adjusted under 35 U.S.C. 154(b) by 0 days. days.

(21) Appl. No.: 14/266,557

(22) Filed: Apr. 30, 2014

Related U.S. Application Data (62) Division of application No. 13/016,832, filed on Jan. 28, 2011, now Pat. No. 8,769,060.

(51) Int. Cl.
*H04L 29/06* (2006.01)
*H04L 29/12* (2006.01)

(52) U.S. Cl.
CPC ...... *H04L 61/2007* (2013.01); *H04L 61/6068* (2013.01)

(58) Field of Classification Search
CPC ........... H04L 29/12301; H04L 61/2076; H04L 29/12066; H04L 61/1511
See application file for complete search history.

(56) References Cited

U.S. PATENT DOCUMENTS

| | | | |
|---|---|---|---|
| 5,978,568 A * | 11/1999 | Abraham et al. | 709/224 |
| 6,396,830 B2 * | 5/2002 | Aravamudan et al. | 370/356 |
| 6,493,551 B1 * | 12/2002 | Wang et al. | 455/432.1 |
| 6,687,245 B2 * | 2/2004 | Fangman et al. | 370/356 |
| 6,961,783 B1 | 11/2005 | Cook et al. | |
| 7,046,659 B1 | 5/2006 | Woundy | |
| 7,188,175 B1 * | 3/2007 | McKeeth | 709/227 |
| 7,594,260 B2 | 9/2009 | Porras et al. | |
| 7,600,042 B2 | 10/2009 | Lemson et al. | |
| 7,730,187 B2 | 6/2010 | Raciborski et al. | |
| 7,840,699 B2 * | 11/2010 | Fujita et al. | 709/238 |
| 8,015,271 B2 * | 9/2011 | McKeown et al. | 709/223 |
| 8,095,685 B2 | 1/2012 | Mattila | |

(Continued)

OTHER PUBLICATIONS

Messaging Anti-Abuse Working Group, Methods for Sharing Dynamic IP Address Space Information with Others, 2008, retreived online <https://www.m3aawg.org/sites/default/files/document/MAAWG_Dynamic_Space_2008-06.pdf>, retrieved on Jul. 20, 2015.*

(Continued)

*Primary Examiner* — Jason K Gee (57) ABSTRACT

A system for providing a Domain Name System (DNS) service may include providing an agent for installation on a subscriber device. The subscriber device may be connected to the DNS service via an entry point device. The system includes receiving, from the agent, agent data indicative of a subscriber identifier and a unique identifier associated with the entry point device. The system may then determine, based on the agent data, a current Internet Protocol (IP) address associated with the entry point device and associate the unique identifier with the subscriber identifier. The system may then dynamically map the subscriber identifier to the current IP address and provide DNS service to the subscriber device based on the current IP address.

18 Claims, 7 Drawing Sheets

(56) References Cited

U.S. PATENT DOCUMENTS

| | | | |
|---|---|---|---|
| 8,549,118 B2* | 10/2013 | Ringen | H04L 29/12066 370/401 |
| 8,554,933 B2 | 10/2013 | Delos Reyes et al. | |
| 8,606,926 B2 | 12/2013 | Ulevitch et al. | |
| 8,631,489 B2 | 1/2014 | Antonakakis et al. | |
| 8,656,026 B1* | 2/2014 | Prasad et al. | 709/227 |
| 8,676,989 B2 | 3/2014 | Treuhaft et al. | |
| 8,694,642 B2 | 4/2014 | Ulevitch et al. | |
| 8,707,429 B2 | 4/2014 | Wilbourn et al. | |
| 8,713,188 B2 | 4/2014 | Treuhaft et al. | |
| 8,762,506 B2 | 6/2014 | Courtney et al. | |
| 8,769,060 B2 | 7/2014 | Avirneni et al. | |
| 8,806,629 B1 | 8/2014 | Cherepov et al. | |
| 8,874,662 B2 | 10/2014 | Graham et al. | |
| 8,996,669 B2 | 3/2015 | Liu et al. | |
| 9,058,381 B2 | 6/2015 | Thomas | |
| 9,215,123 B1 | 12/2015 | Fears et al. | |
| 9,686,275 B2 | 6/2017 | Chari et al. | |
| 2001/0034759 A1* | 10/2001 | Chiles et al. | 709/203 |
| 2001/0043595 A1* | 11/2001 | Aravamudan et al. | 370/356 |
| 2001/0044903 A1* | 11/2001 | Yamamoto et al. | 713/200 |
| 2002/0143705 A1 | 10/2002 | Kaars | |
| 2003/0177236 A1* | 9/2003 | Goto | H04L 29/12009 709/225 |
| 2005/0060535 A1 | 3/2005 | Bartas | |
| 2005/0102529 A1* | 5/2005 | Buddhikot et al. | 713/200 |
| 2005/0111384 A1 | 5/2005 | Ishihara et al. | |
| 2005/0125195 A1 | 6/2005 | Brendel | |
| 2005/0276272 A1* | 12/2005 | Arai | 370/401 |
| 2006/0020525 A1* | 1/2006 | Borelli et al. | 705/34 |
| 2006/0062228 A1* | 3/2006 | Ota et al. | 370/401 |
| 2006/0168065 A1 | 7/2006 | Martin | |
| 2007/0058792 A1 | 3/2007 | Chaudhari et al. | |
| 2007/0079379 A1 | 4/2007 | Sprosts et al. | |
| 2007/0088815 A1* | 4/2007 | Ma et al. | 709/224 |
| 2008/0259941 A1* | 10/2008 | Zhao et al. | 370/401 |
| 2009/0067331 A1 | 3/2009 | Watsen et al. | |
| 2009/0129301 A1* | 5/2009 | Belimpasakis | 370/310 |
| 2009/0144419 A1 | 6/2009 | Riordan et al. | |
| 2009/0253404 A1* | 10/2009 | Alston et al. | 455/405 |
| 2009/0282028 A1 | 11/2009 | Subotin et al. | |
| 2009/0282038 A1 | 11/2009 | Subotin et al. | |
| 2009/0296567 A1 | 12/2009 | Yasrebi et al. | |
| 2010/0030914 A1 | 2/2010 | Sparks et al. | |
| 2010/0106854 A1 | 4/2010 | Kim et al. | |
| 2010/0121981 A1 | 5/2010 | Drako | |
| 2010/0131646 A1 | 5/2010 | Drako | |
| 2010/0211628 A1 | 8/2010 | Shah | |
| 2010/0217837 A1* | 8/2010 | Ansari et al. | 709/218 |
| 2010/0303009 A1 | 12/2010 | Liu | |
| 2011/0213967 A1 | 9/2011 | Wnuk | |
| 2011/0246169 A1 | 10/2011 | Liu et al. | |
| 2011/0296171 A1 | 12/2011 | Fu et al. | |
| 2011/0296172 A1 | 12/2011 | Fu et al. | |
| 2012/0036241 A1 | 2/2012 | Jennings et al. | |
| 2012/0178416 A1 | 7/2012 | Miklos et al. | |
| 2012/0198034 A1 | 8/2012 | Avirneni et al. | |
| 2012/0246315 A1 | 9/2012 | Kagan | |
| 2012/0254996 A1 | 10/2012 | Wilbourn et al. | |
| 2013/0333016 A1 | 12/2013 | Coughlin et al. | |
| 2014/0052984 A1 | 2/2014 | Gupta | |
| 2014/0123222 A1 | 5/2014 | Omar | |
| 2016/0099961 A1 | 4/2016 | Paugh et al. | |

OTHER PUBLICATIONS

Vixie et al., "Secret key Transaction Authentication for DNS (TSIG)," Network Working Group, May 2000, http://tools.ietf.org/pdf/rfc2845.pdf.

Park, Jeong-Hyun, "Wireless Internet access for mobile subscribers based on the GPRS/UMTS network," Communications Magazine, IEEE, vol. 40, No. 4, pp. 38-49, Apr. 2002.

Zhao et al., "A Prediction Model of DoS Attack's Distribution Discrete Probability," Web-Age Information Management, 2008. WAIM '08. The Ninth International Conference on Jul. 20, 2008, pp. 625-628.

Moore et al., "Internet Traffic Classification Using Bayesian Analysis Techniques," SIGMETRICS '05 Proceedings of the 2005 ACM Sigmetrics international conference on Measurement and modeling of computer systems, ACM Sigmetrics Performance Evaluation Review—Performance evaluation review, vol. 33 Issue 1, Jun. 2005, pp. 50-60.

Zargar et al., "A Survey of Defence Mechanisms Against Distributed Denial of Service (DDoS) Flooding Attacks," IEEE communications Surveys & Tutorials (vol. 15, Issue: 4, Fourth Quarter 2013), 2013, pp. 2046-2069.

Zhang et al., "Internet Traffic Classification by Aggregating Correlated Naïve Bayes Predictions," IEEE Transactions on Information Forensics and Security (vol. 8, Issue: 1, Jan. 2013), 2013, pp. 5-15.

* cited by examiner

SYSTEMS AND METHODS FOR PROVIDING DNS SERVICES

CROSS-REFERENCE TO RELATED APPLICATIONS

This nonprovisional U.S. patent application is a divisional of U.S. patent application Ser. No. 13/016,832, filed Jan. 28, 2011, and titled "Systems and Methods for Providing DNS Services," now U.S. Pat. No. 8,769,060, issued on Jul. 1, 2014. The disclosure of the above referenced application is hereby incorporated by reference.

FIELD OF THE INVENTION

This application relates generally to data processing and, more specifically, to systems and methods for providing Domain Name System (DNS) services.

BACKGROUND

Domain Name System (DNS) software solutions may function as standalone elements in a network or in combination with hosted network services and consumer applications to deliver better network resiliency and performance, improved end user security and rich navigation. In addition to enabling the Internet, a DNS software solution can make the Internet better by seamlessly reacting to an event based on a policy rule set.

A DNS serves as the phone book for the Internet by translating human-friendly computer hostnames into Internet Protocol (IP) addresses. An IP address is a numerical label assigned to each device (e.g., computer, printer) participating in a computer network that uses the IP for communication. The DNS makes it possible to assign domain names to Internet resources and devices based on their IP addresses in a meaningful way, independent of the physical location of the resources and devices. However, an Internet Service Provider (ISP) may reallocate IP addresses to allow many devices to share limited address space on a network if only some of the devices will be online at a particular time. This dynamic IP allocation complicates services provided by DNS software solutions by requiring frequent remapping of IP addresses.

Furthermore, ISPs typically do not provide a separate IP to every device within a local network. Instead, a single IP address is provided to the device serving as the network's entry point device. Such a network entry point device is commonly known as a gateway (e.g., a router). This further complicates services provided by DNS software solutions by requiring them to establish a different level of service (if at all) for various devices associated with the same IP address and/or entry point device.

SUMMARY OF THE INVENTION

This summary is provided to introduce a selection of concepts in a simplified form that are further described below in the detailed description of the invention. This summary is not intended to identify key features or essential features of the claimed subject matter, nor is it intended to be used as an aid in determining the scope of the claimed subject matter.

In an embodiment, a computer-implemented method for providing a DNS service comprises providing an agent for installation on a subscriber device, with the subscriber device being connected to the DNS service via an entry point device; receiving, from the agent, agent data indicative of a subscriber identifier and a unique identifier associated with the entry point device; determining a current IP address associated with the entry point device based on the agent data; associating the unique identifier with the subscriber identifier; dynamically mapping the subscriber identifier to the current IP address; and providing the DNS service to the subscriber device based on the current IP address.

The agent data may include a unique string synthesized from the entry point unique identifier and the subscriber identifier. The data may be discarded by the agent if the unique string does not match a previous version of the unique string. The data may be discarded after being received and compared to a provisional value of the unique string being associated with a subscriber account. The method may further comprise determining that the entry point device is accessible with a preset authentication code and displaying a notification suggesting changing the authentication code.

The determination of the current IP address associated with the entry point device is based on a response provided by an Internet service which may include an IP-monitoring DNS server. The DNS service may be implemented by intercepting DNS requests of the entry point device and forwarding the one or more requests to a DNS server of the DNS service. The agent may perform initial configuration of a DNS resolver of the entry point device, monitor IP addresses, and resolve configurations of DNS settings. The method may further comprise monitoring the initial configuration, determining that the initial configuration has been altered, and reinstituting the initial configuration if altered.

The method may further comprise determining that a third party subscriber device joins a network associated with the entry point device, and may also provide, if deemed appropriate, the agent for installation on the third party subscriber device. The method may further comprise receiving, from a third party agent, third party agent data indicative of a third party subscriber identifier and the unique identifier associated with the entry point device and determining, based on the third party agent data that a third party subscriber device is accessing the DNS service via the entry point device. The method may then provide the DNS service to the third party subscriber device based on the determination that the third party subscriber device does not affect the service provided to devices attached to a local network.

The third party agent data may include a unique string synthesized from the entry point unique identifier and the subscriber identifier, and the third party data may be discarded by the third party agent if the unique string does not match a previous version of the unique string. Alternatively, the third party data may be discarded after being received and compared to a provisional value of the unique string being associated with a subscriber account.

The method may further comprise receiving, from the agent, the agent data indicative of the subscriber identifier and a third party unique identifier associated with a third entry point device; determining, based on agent data that the third party entry point device is not associated with the DNS service; and based on the determination, providing the DNS service to the subscriber device.

The method may further comprise receiving, from the agent, the agent data indicative of the subscriber identifier and a new unique identifier associated with a new entry point device; requesting a subscriber confirmation to associate the subscriber identifier with the new entry point device; receiving the subscriber confirmation; and associating the unique identifier with the subscriber identifier. The entry point device may be a device that provides Internet access both to itself and to other devices connected to it.

In another embodiment, a method for providing a DNS service comprises providing an agent for integration within an ISP; receiving, from the ISP, IP allocation data associated with a subscriber IP address, with the IP allocation data further including a subscriber identifier and a unique identifier associated with an entry point device; associating the unique identifier with the subscriber identifier; dynamically mapping the subscriber device to the entry point device IP address; and providing the DNS service to the subscriber device based on the entry point device IP address.

The IP allocation data may be in a plurality of different formats. The IP allocation data may be cached with an update being provided when the subscriber IP address changes. A subscriber may be directed to a captive portal to facilitate collection of subscriber data. The entry point device may be connected to the DNS via a wireless network. The entry point devices may be associated with a home network. The ISP may assign IP information to the entry point device. The agent may periodically check the unique identifier associated with the entry point device.

In further exemplary embodiments, modules, subsystems, or devices can be adapted to perform the recited steps. Other features and exemplary embodiments are described below.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

Systems and methods for providing DNS-based services may allow tracking and mapping of dynamically allocated IP addresses associated with subscriber devices. Additionally, the systems and methods for providing DNS services may allow maintaining the appropriate level of service for subscriber devices regardless of the IP associated with the current entry device as long as the IP is associated with a valid subscriber.

An IP address is critical to any DNS-based software solution. Any entry point device and a device connecting directly to the Internet have an IP address allowing it to communicate to other online resources. However, the IP address assigned to a subscriber device can be changed periodically by the ISP. The systems and methods described herein relate to designs and architectures to manage and track subscriber IP addresses to associate DNS services to specific IP addresses.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
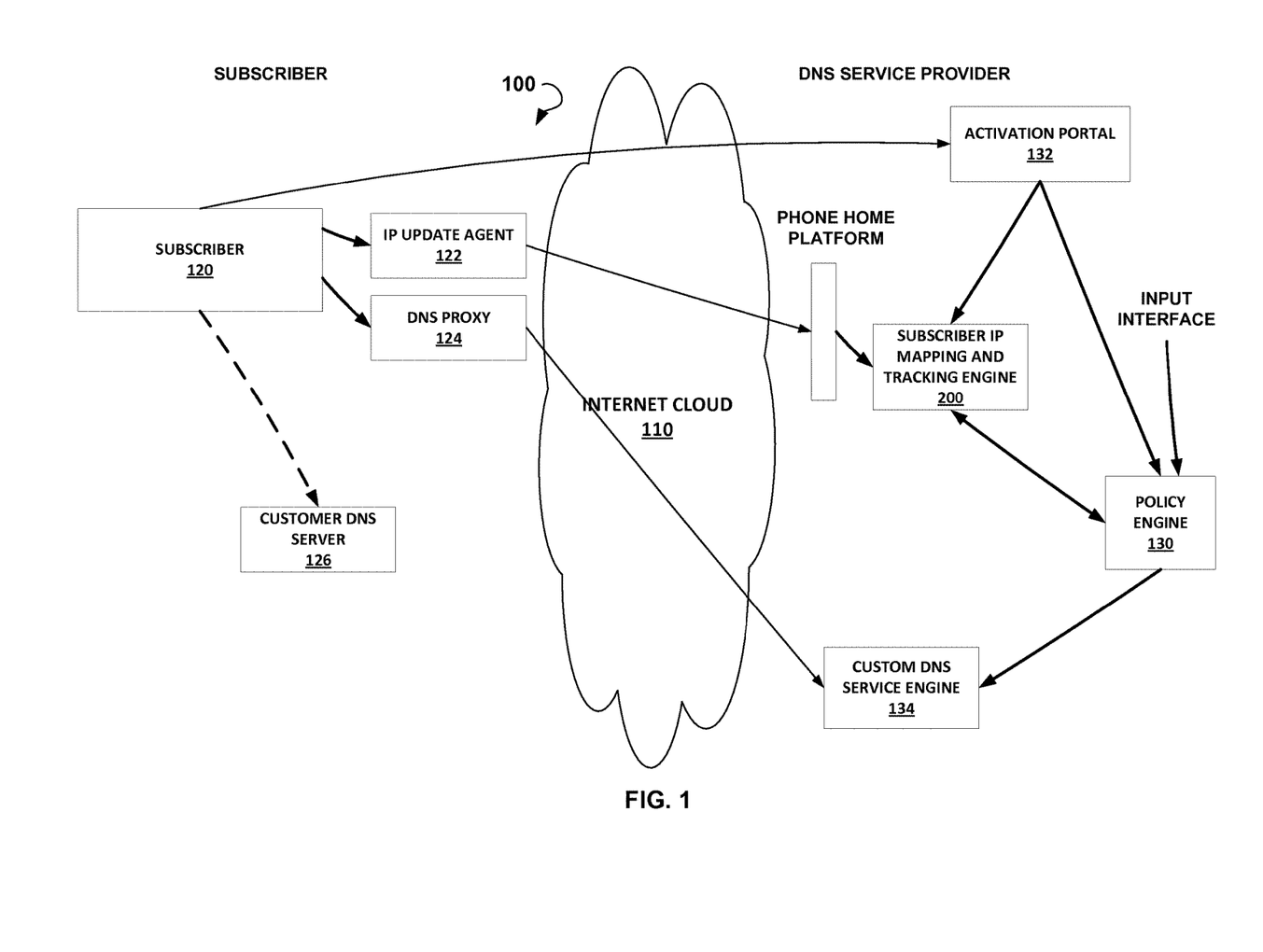
FIG. 1 is a block diagram of a network environment within which systems and methods for providing DNS services are implemented.

FIG. 1 is a block diagram of a network environment 100 within which systems and methods for providing DNS services may be implemented. The network environment 100 may include subscriber and DNS service provider networks interconnected by an Internet cloud 110. The Internet cloud 110 may include data processing nodes interconnected for the purpose of data communication and may communicatively couple various modules within the subscriber and DNS service provider network. These modules, on the subscriber side, may include a subscriber 120, an IP update agent 122, a DNS proxy 124, and a customer DNS server 126. On the DNS service provider side, the modules may include a policy engine 130, an activation portal 132, a custom DNS service engine 134, and a subscriber IP mapping and tracking engine 200.

At least two different scenarios are being considered. The first scenario concerns a standalone system, a system in which the ISP does not provide any IP allocation information to the DNS service. Therefore, the system captures initial information concerning the subscriber 120 and associated hardware devices during the initial sign-up process. During the initial sign-up process, the subscriber 120 may be directed to the activation portal 132 to provide information required to activate the DNS service. The information collected during the sign-up process may include the current IP address of an entry point device or a subscriber device, if the subscriber device is connecting to the Internet cloud 110 directly. However, going forward, the DNS service should have a method of keeping track of the changing IP address. One way of doing this is to have an agent 122 installed on a subscriber device. The agent 122 will report any changes in the IP address of the entry point device to the DNS service. Once the agent 122 is installed on the subscriber device, the agent 122 sends back information stating that it is configured and it knows who the subscriber 120 is. As a subscriber uses the DNS service, the agent 122 constantly sends updates. The agent may report a subscriber identifier and the unique address of the entry point device. Additionally, the IP address of the entry point device is included in any packet of information sent by the agent 122.

The second scenario concerns an ISP integrated system, the system in which the ISP provides the DNS service with current IP allocation information. An ISP may already have a method by which it allocates IP addresses and remembers current IP allocation data. This current IP allocation data can be retrieved from the ISP by the DNS service or pushed to an agent employed by the DNS service. The DNS service may provide a remote agent capable of taking inputs from the ISP, with the inputs providing information about the changes in IP allocations. There may be different sources of such IP allocation data because each ISP may have different ways of storing allocations of IP addresses. Some ISPs may provide access to their database or simply push their data to the remote agent. In contrast, other ISPs may not wish to share their databases and will instead send logs with the IP allocation data to the DNS service. To accommodate different formats and methods of sharing IP allocation data, the DNS service may employ an interface capable of processing most common scenarios.

Additionally, in the ISP integrated model, multiple agents may be distributed around the ISP, each having an internal cache table. When the agent receives data concerning an IP address, it may compare the IP address to the one stored in the cache table. If there is no change in the IP address allocation of the subscriber, the DNS service does not need to update its records. This caching function may result in preventing duplications and considerable decrease in the number of updates needed.

Figure 2:
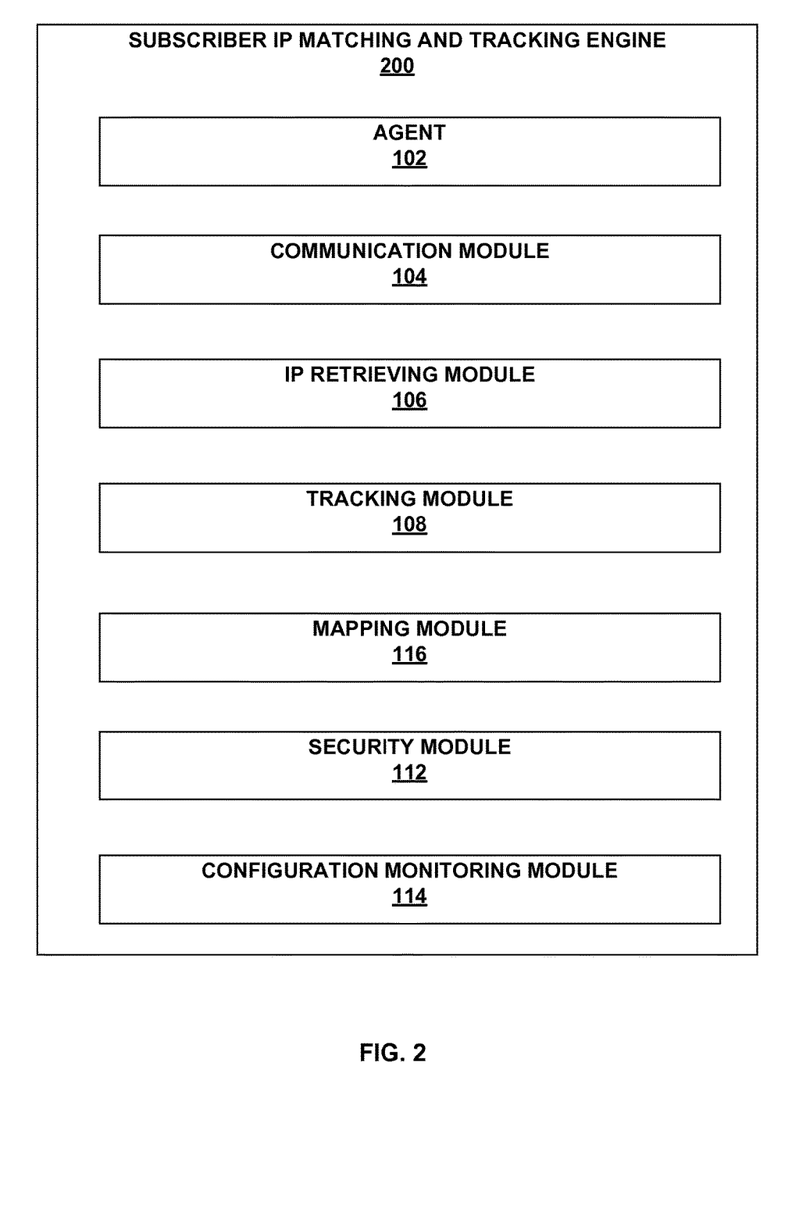
FIG. 2 is a block diagram of a subscriber IP matching and tracking engine.

FIG. 2 is a block diagram of a subscriber IP matching and tracking engine 200, in accordance with various embodiments. Alternative embodiments of the subscriber IP matching and tracking engine 200 may comprise more, less, or functionally equivalent modules. In some embodiments, the subscriber IP matching and tracking engine 200 may include an agent 102 for installation on a subscriber device. The subscriber device may be connected to the DNS service via an entry point device. The subscriber IP matching and tracking engine 200 may further include a communication module 104 configured to receive, from the agent 102, a subscriber identifier and a unique identifier associated with the entry point device. The subscriber IP matching and tracking engine 200 may further include an IP retrieving module 106 to determine, based on the agent data, a current IP address associated with the entry point device. The subscriber IP matching and tracking engine 200 may further include a tracking module 108 configured to associate the unique identifier with the subscriber identifier. The subscriber IP matching and tracking engine 200 may further include a mapping module 116 configured to dynamically map the subscriber identifier to the current IP address. The subscriber IP matching and tracking engine 200 may further include a security module 112 to determine whether the entry point device is accessible with a preset authentication code, and if yes, to display a notification suggesting changing the authentication code. The subscriber IP matching and tracking engine 200 may further include a configuration monitoring module 114 to monitor and determine the initial configuration, determine whether the initial configuration has been altered, and if yes, reinstitute the initial configuration. Functionalities of various modules of the subscriber IP matching and tracking engine 200 are described in further detail with reference to FIGS. 3 and 4 below.

Figure 3:
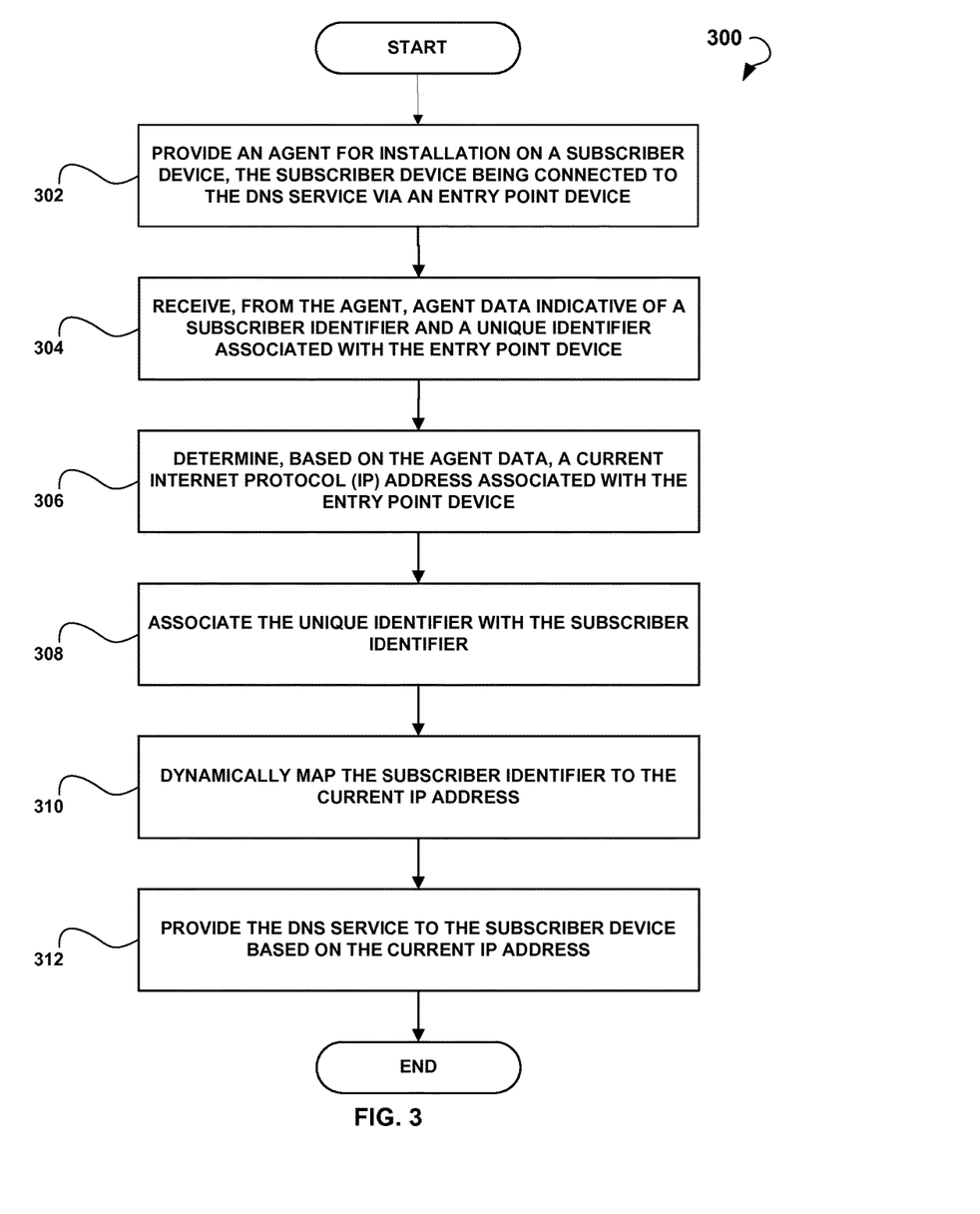
FIG. 3 illustrates a flow chart of a method for providing a DNS service.

FIG. 3 illustrates a flow chart of a method 300 for providing a DNS service. The method 300 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the subscriber IP matching and tracking engine 200, as illustrated in FIG. 1.

The method 300 may be performed by the various modules discussed above with reference to FIG. 1. Each of these modules may comprise processing logic. The method 300 may commence at operation 302 with the agent being provided for installation on a subscriber device. The subscriber may be connected to the DNS service via an entry point device. The entry point device includes but is not limited to the following devices: a router, a laptop computer, a desktop computer, a tablet computer, a mobile device, a Television (TV) set, set-top box, a wireless card, a Digital Subscriber Line (DSL) router, a cable router, a home networking device, a network switch, a wireless access point, a video game console, a Blu-ray player, a digital media receiver, an Internet connected television platform, an automobile, and a satellite navigation system.

During the installation, the subscriber 120 may be directed to the activation portal 132. If it is determined, during the installation process, that the entry point device is accessible with a preset authentication code, a notification suggesting changing the authentication code may be displayed.

At operation 304 the communication module 104 may receive, from an agent installed on the subscriber device, a subscriber identifier and a unique identifier associated with the entry point device. In some cases, the entry point device and the subscriber device are the same device. The agent data may also include a unique string synthesized from the entry point unique identifier and the subscriber identifier. If the unique string does not match a previous version of the unique string, the data may be discarded. Alternatively, the data may be discarded after being received and compared to a provisional value of the unique string being associated with a subscriber account. Based on the agent data at operation 306, the IP retrieving module 106 may determine a current IP address associated with the entry point device. The determination of the current IP address associated with the entry point device may be based on a response provided by an Internet service (for example, an address monitoring DNS server).

At operation 308, the tracking module 108 may associate the unique identifier with the subscriber identifier and, at operation 310, the mapping module 116 may dynamically map the subscriber identifier to the current IP address. Accordingly, at operation 312, the policy engine 130 may provide the DNS service to the subscriber device based on the current IP address. The DNS service may be implemented by intercepting DNS requests of the entry point device and by forwarding the requests to a DNS server of the DNS service. An initial configuration of a DNS resolver of the entry point device may be performed by the agent at the installation. Thereafter, the agent may monitor IP addresses and resolve configurations of DNS settings. If the agent determines that the initial configuration has been altered, it may reinstitute the initial configuration.

A situation may arise where a third party subscriber device is attempting to connect to the Internet via the subscriber's entry point device. The DNS service may notice, based on the subscriber identifier, that the packets of data reporting the entry point device's IP address are originating from the third party subscriber device. Assuming that the entry point device is active and also sends packets of data to the DNS service, the situation may cause confusion in the services provided to both devices. The issue may be resolved by recognizing that the third party subscriber device is connected via the entry point device on a temporary basis and therefore the services provided to the subscriber device and the third party subscriber device should remain respectively unchanged. This results in the services remaining constant to the household irrespective of who is visiting. In the case of a business (e.g. Starbucks), one subscriber identifier can be associated with multiple entry point devices. Having this system in place will ensure that a subscriber visiting a business location will not result in any changes to the service in that location.

Thus, when third party data includes a third party subscriber identifier and the unique identifier associated with the entry point device, it may be determined that a third party subscriber device is accessing the DNS service via the entry point device. Based on this determination, the DNS service may be provided to the third party subscriber device while ensuring that the third party subscriber device does not affect the service provided to devices attached to a local network.

The third party agent data may include a unique string synthesized from the entry point unique identifier and the subscriber identifier. The third party data may be discarded by the third party agent if the unique string does not match a previous version of the unique string. Alternatively, the third party data may be discarded after being received and compared to a provisional value of the unique string being associated with a subscriber account.

In the case of a non-subscriber visiting a subscriber, the non-subscriber may be prevented from using the DNS service. The non-subscriber may receive an offer to subscribe to the DNS service or temporarily associate his or her device with the DNS service provided to the subscriber. The non-subscriber may optionally be directed to a captive portal in order to install the agent.

In the case where a subscriber visits a non-subscriber, the agent data may include the subscriber identifier and a third party unique identifier associated with a third entry point device. It may be determined that the third party entry point device is not associated with the DNS service, and based on the determination, regular DNS service associated with the provider may be provided to the subscriber device regardless of the fact that the third party entry point device is not associated with the subscriber.

When the subscriber wishes to replace the entry point device, he or she may be directed to a captive portal to re-provision the service. The agent may already be installed on the subscriber device and can reprogram once the entry point device is re-provisioned. When the subscriber adds a new subscriber device to the home network, a new agent can be installed on the new device and the subscriber will go through a sign-up process that associates the new device with the subscriber identifier. It will be understood that the system is not limited to wired entry point devices and may also incorporate mobile networks.

Thus the agent data may include the subscriber identifier and a new unique identifier associated with a new entry point device. The subscriber may be required to confirm the associating of the subscriber identifier with the new entry point device. Once the subscriber confirmation is received, the unique identifier may be associated with the subscriber identifier.

Figure 4:
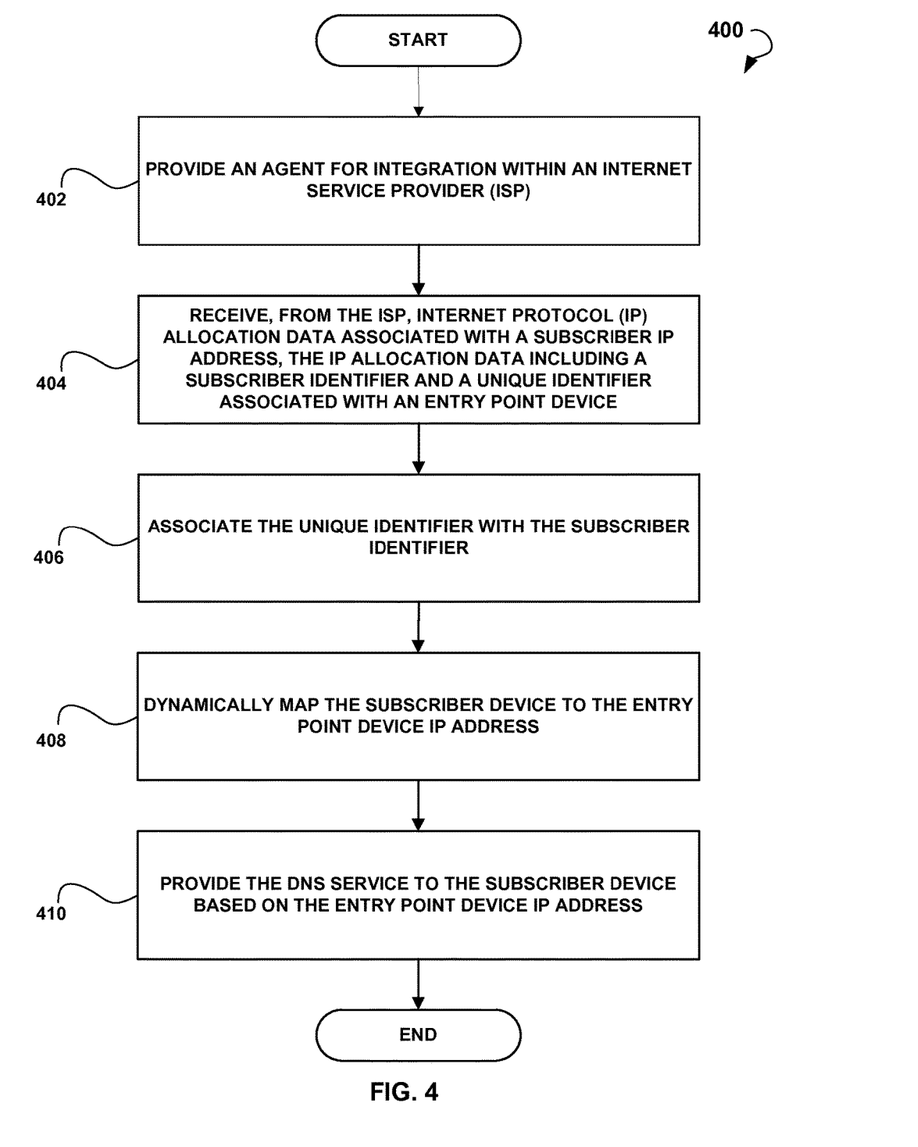
FIG. 4 illustrates a flow chart of a method for providing a DNS service within an ISP integrated environment.

FIG. 4 illustrates a flow chart of a method 400 for providing a DNS service within an ISP integrated environment, in accordance with various embodiments. The method 400 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the subscriber IP matching and tracking engine 200, as illustrated in FIG. 1.

The method 400 may be performed by the various modules discussed above with reference to FIG. 1. Each of these modules may comprise processing logic. The method 400 may commence at operation 402 with one or more agents being configured for integration with an ISP. At operation 404, the communication module 104 may receive, from the ISP, IP allocation data associated with a subscriber IP address. The IP allocation data may be in a plurality of different formats. The IP allocation data may be cached, and an update may only be provided when the subscriber IP address changes. The agent may periodically check the unique identifier associated with the entry point device, either at each message event or each time a network interface comes up.

The IP allocation data includes a subscriber identifier and a unique identifier associated with an entry point device. The unique identifier may include, but is not limited to, the following devices: a Media Access Control (MAC) address, a key associated with the entry point device, and a manufacturer-assigned unique identifier.

At operation 406, the tracking module 108 may associate the unique identifier with the subscriber identifier and, at operation 408, the mapping module 116 may dynamically map the subscriber device to the entry point device IP address. Accordingly, the policy engine 130 may provide the DNS service to the subscriber device based on the entry point device IP address at operation 410.

Figure 5:
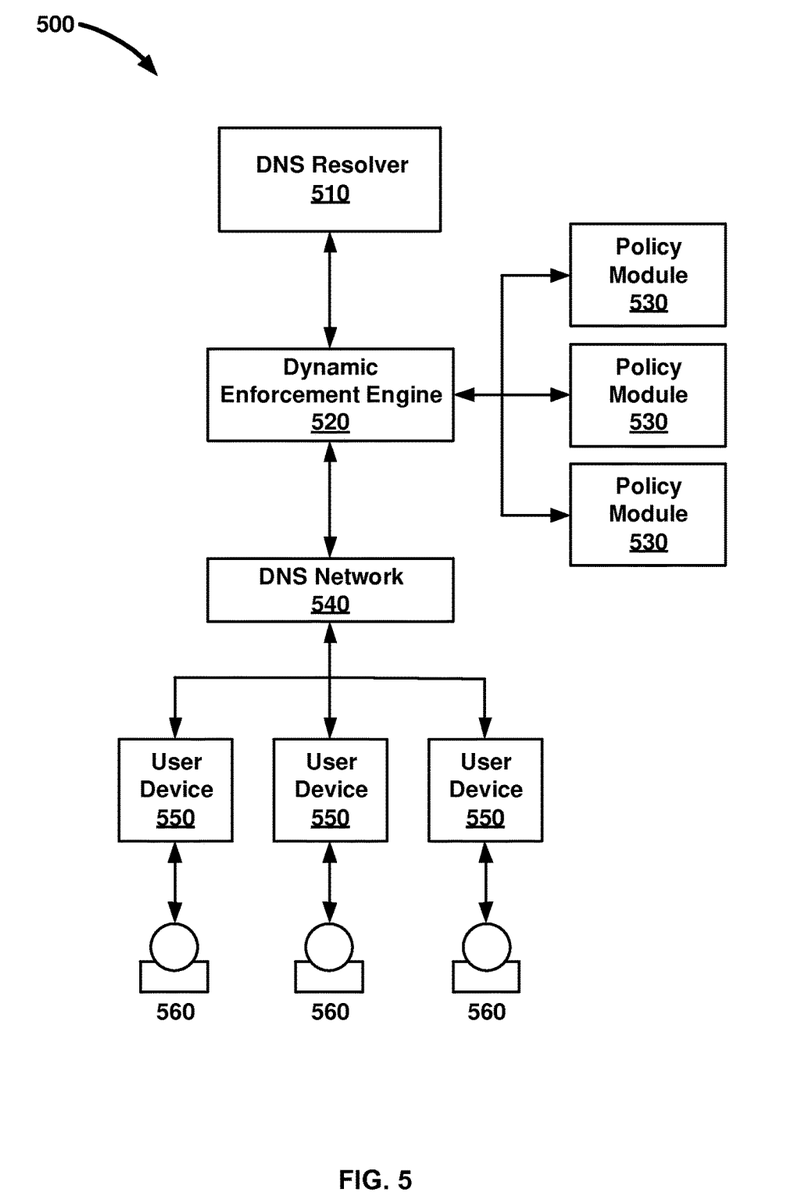
FIG. 5 is a block diagram of a DNS resolver environment.

FIG. 5 illustrates an exemplary Internet service system 500, with a DNS Resolver 510, that may be utilized to support the above described systems and methods. A DNS Resolver 510 operates in conjunction with a dynamic enforcement engine 520. The dynamic enforcement engine 520 may operate in conjunction with one or more policy modules 530 to establish any applicable polices at the DNS Resolver 510 level. The content rules are applied to received user queries to determine which content is delivered by the DNS network 540 through various user devices 550 to the network users 560.

The dynamic enforcement engine 520 may generate its policy engine on instructions received from one or more policy modules 530. Each policy module 530 may be constructed to provide various types and levels of services to the DNS network 540. In various embodiments, a policy module 530 may be configured to handle queries directed to subjects including, but not limited to, malicious domain redirection, user access redirection, non-existent domain redirection, and data collection or analysis.

Figure 6:
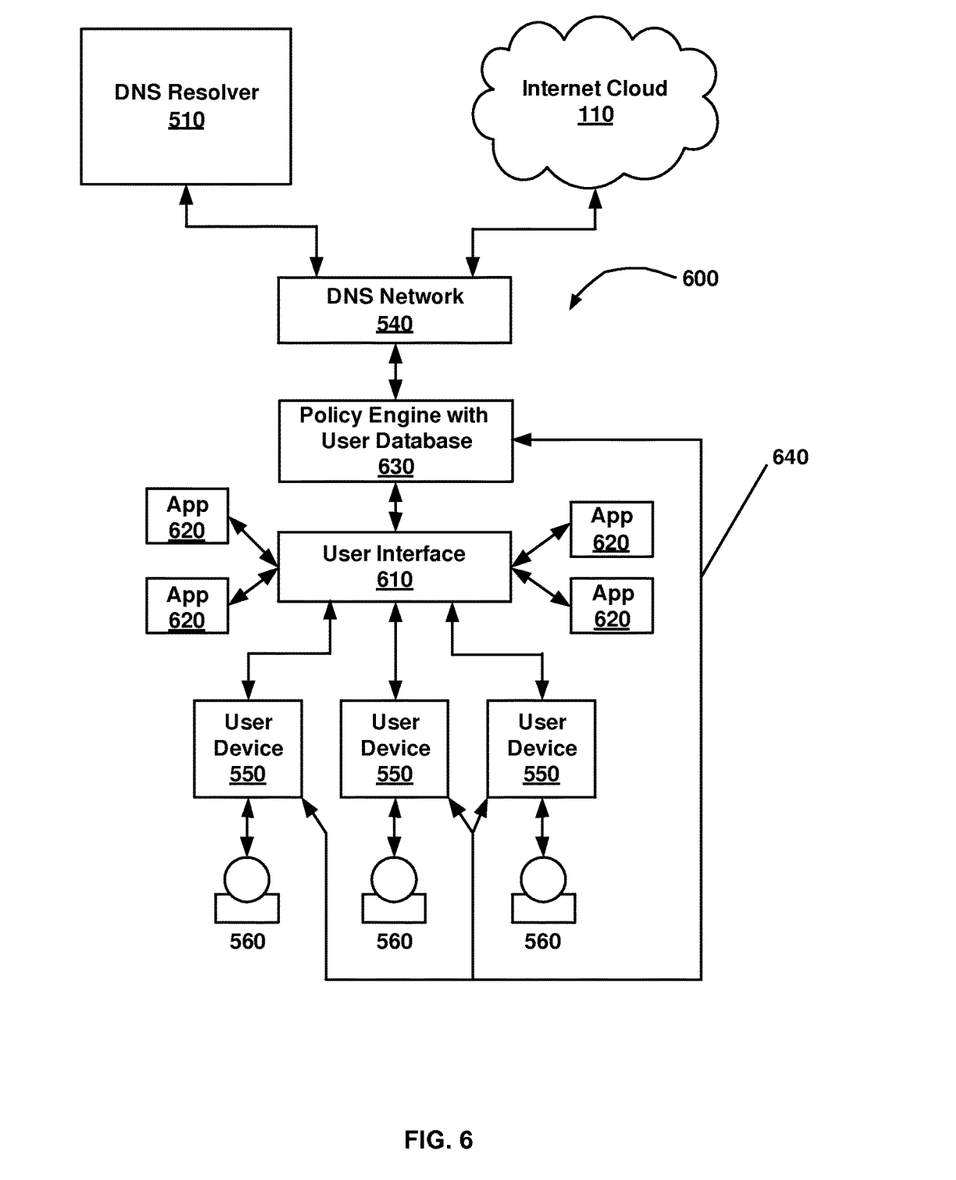
FIG. 6 is a block diagram of a system within which various DNS policies are implemented.

FIG. 6 shows a schematic layout of an exemplary system 600 for implementing direct and variable network user control. FIG. 6 illustrates that the system 600 may operate installed on a DNS Resolver 510, or with a cloud 650-based installation.

The system 600 utilizes a user interface 610. The user interface 610 may be implemented in many embodiments. One specific implementation of the user interface 610 is as a web page.

The user interface 610 may be accessed by one or more user devices 550 operated by users 560. The user interface 610 may be accessed through a gateway user device 550 available to users 560. Suitable user devices 550 include, but are not limited to, desktop computers, personal computers (PCs), laptops, notebooks, gaming devices, iPods, iPhones, automobile computer systems, and Internet enabled TVs. The system 600 may also be accessed and controlled through remote control user devices 550, such as Smartphones. A Smartphone may be defined as a phone with computing capability. A Smartphone may provide the user 560 with Internet access.

The user interface 610 provides a mechanism for one or more authorized users 560 to establish content policy for the Internet service. The user interface 610 operates between the user devices 550 present in the system 600 and the DNS network 540. Instructions resident on the user interface 610 therefore operate on the Internet service, by controlling at least a portion of DNS resolutions via a dynamic policy engine 630, before the service reaches the displays of the user devices 550.

The user interface 610 provides users 560 with access to one or more policy applications 620. The user interface 610 may provide access to a selection list to at least one authorized user 560. The authorized user 560 uses the selection list or some other menu mechanism to select those policy applications 620 that the user 560 chooses to apply to the system 600. The authorized user 560 may select any number of the available policy applications 620 for use on the system 600 at any given time. In implementations utilizing Smartphones as the user device 550, the policy applications 620 are downloaded to the user device 550. The user device 550 then serves as the user interface 610 to communicate directly with the dynamic policy engine 630.

The policy applications 620 may prohibit access to specific Internet content. The policy applications 620 may also limit the time of day when users or selected users 560 may access certain Internet content. The policy applications 620 may also manage and analyze the duration of access to various Internet content. It is important to note that the policy applications 620 do not simply provide blocking mechanisms by masking or enabling network controls, but rather mediate an Internet service received by the network user. As used herein, mediating the service may include any of blocking, constraining, enabling, redirecting, promoting, demoting, substituting, obscuring, limiting, interrupting, and restricting all or a portion of the Internet service. The policy applications 620 may provide notifications or alerts to one or more users 560 when an Internet content is accessed. The policy applications 620 may also provide notification of frequency and duration of access of designated Internet content. The policy applications 620 may also be used to observe, substitute, enable, redirect users, reward behavior desired from the users by a system administrator, and so forth. The policy applications 620 may redirect users from non-favored Internet content to different Internet content. The policy applications 620 may also collect and transmit data characteristic of Internet use.

Access policies supplied by the policy applications 620 may apply to all users 560 of the system 600, or the access policies may be specific to individual users or groups of users 560. The policy applications 620 may be discrete, single purpose applications.

The policy applications 620 provide the users 560 with a mechanism to take various actions relative to their Internet service feed. The policy applications 620 also allow the users 560 to establish a dynamic policy engine 630 that includes a user database. The dynamic policy engine 630 is used to enforce rules associated with each policy application associated with individual network users, rather than simply block various inappropriate Internet content from the Internet feed. The dynamic policy engine 630, controlled by the user interface 610 through user device(s) 550, is used to manage all aspects of the Internet experience for the users 560. In sum, the policy applications 620 may be used to configure the dynamic policy engine 630 to provide the users 560 with a mechanism to personalize their Internet experience. The policy applications 620 may be configured in combinations and may each be separately configured.

The database in the dynamic policy engine 630 may be used to record and to notify users 560 of various data relative to Internet access. The data collected from and provided to the users 560 may include records of access of specific Internet content, time spent on specific Internet content, time of day of access, data specific to individual users, and so forth.

It should also be noted that following an initial setup through the user interface 610 of the dynamic policy engine 630, a direct access 640 enforcement loop may be established between the dynamic policy engine 630 and the user devices 550. Subsequent accessing of the DNS network 540 utilizing the direct access 640 decreases response time in the system 600, thereby further enhancing the Internet experience of the users 560. Configurations of policy applications 620 that are selected by one or more users 560 designated as system administrators may remain in the user database of the dynamic policy engine 630 until such time as they may be modified by the system administrators. The system administrators may define multiple policy configurations, with a combination of policy applications 620, applicable to one or more network users 560 of the system 600. Each policy application 620 may also be separately configurable. Policy configurations may vary based upon designated times, conditional triggers, or specific requests from the users 560 with administrative authority.

As indicated above, two discrete data flow paths may be established for the system 600. A first data path establishes a set of enforcement policies for the system 600. The first data path flows from at least one user device 550 through the user interface 610 to the dynamic policy engine 630. A second data path may be utilized following the establishment of a set of policies for the system 600 whereby a direct access 640 enforcement loop flows directly between the user device(s) 550 and the dynamic policy engine 630. Multiple sets of enforcement policies may be established and saved within the system 600 and implemented selectively by the users 560.

Figure 7:
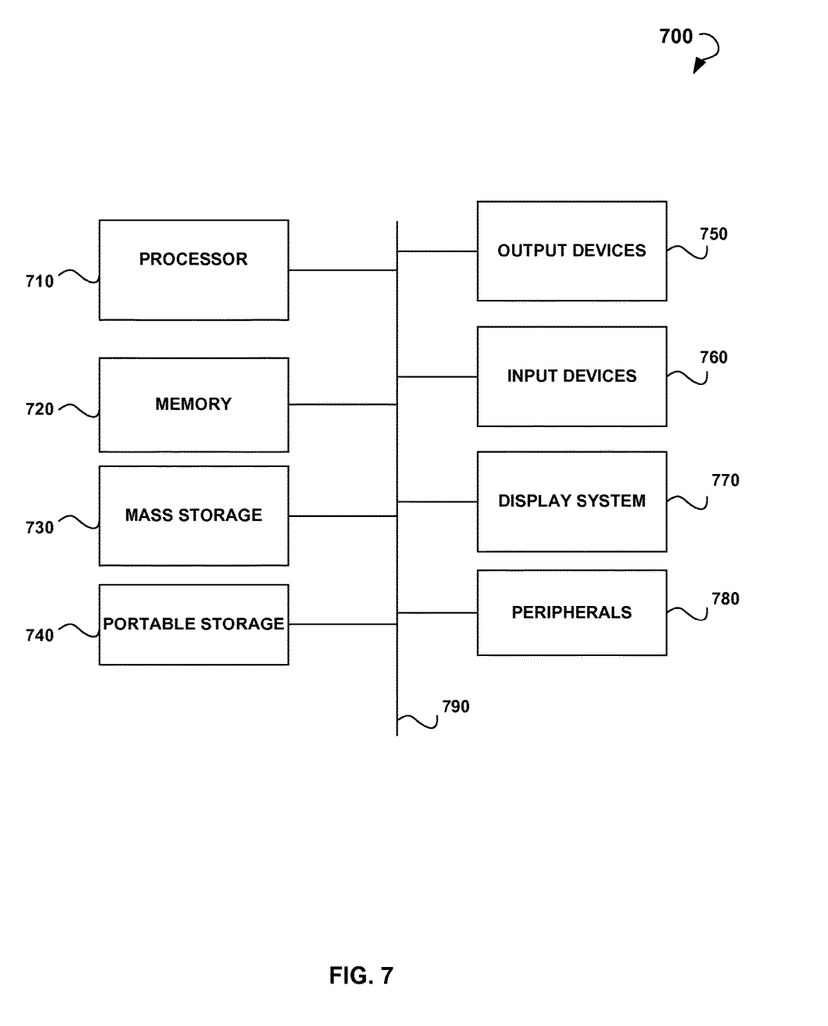
FIG. 7 is a computing system that may be used to implement the methods for providing a DNS service.

FIG. 7 illustrates an exemplary computing system 700 that may be used to implement an embodiment of the present invention. System 700 of FIG. 7 may be implemented in the context of user devices 550, DNS Resolver 510, Internet cloud 110 and the like. The computing system 700 of FIG. 7 includes one or more processors 710 and main memory 720. Main memory 720 stores, in part, instructions and data for execution by processor 710. Main memory 720 can store the executable code when the system 700 is in operation. The system 700 of FIG. 7 may further include a mass storage device 730, portable storage medium drive(s) 740, output devices 750, user input devices 760, a display system 770, and other peripheral devices 780.

The components shown in FIG. 7 are depicted as being connected via a single bus 790. The components may be connected through one or more data transport means. Processor 710 and main memory 720 may be connected via a local microprocessor bus, and the mass storage device 730, peripheral device(s) 780, portable storage medium drive 740, and display system 770 may be connected via one or more input/output (I/O) buses.

Mass storage device 730, which may be implemented with a magnetic disk drive or an optical disk drive, is a non-volatile storage device for storing data and instructions for use by processor 710. Mass storage device 730 can store the system software for implementing embodiments of the present invention for purposes of loading that software into main memory 720.

Portable storage medium drive 740 operates in conjunction with a portable non-volatile storage medium, such as a floppy disk, compact disk (CD), or digital video disc (DVD), to input and output data and code to and from the computer system 700 of FIG. 7. The system software for implementing embodiments of the present invention may be stored on such a portable medium and input to the computer system 700 via the portable storage medium drive 740.

Input devices 760 provide a portion of a user interface. Input devices 760 may include an alpha-numeric keypad, such as a keyboard, for inputting alpha-numeric and other information, or a pointing device, such as a mouse, trackball, stylus, or cursor direction keys. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information and processes the information for output to the display device.

Peripheral device(s) 780 may include any type of computer support device to add additional functionality to the computer system. Peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a PC, hand held computing device, telephone, mobile computing device, workstation, server, minicomputer, mainframe computer, or any other computing device. The computer can also include different bus configurations, networked platforms, multi-processor platforms, and so forth. Various operating systems can be used, including Android, UNIX, Linux, Windows, Macintosh OS, Palm OS, and other suitable operating systems.

Some of the above-described functions may be composed of instructions that are stored on storage media (e.g., a computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system Random Access Memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. For example, this description describes the technology in the context of an Internet service in conjunction with a DNS resolver. It will be appreciated by those skilled in the art that functionalities and method steps that are performed by a DNS resolver may be performed by an Internet service. One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein. One skilled in the art will further appreciate that the term "Internet content" comprises one or more of web sites, domains, web pages, web addresses, hyperlinks, URLs, any text, pictures, and/or media (such as video, audio, and any combination of audio and video) provided or displayed on a web page, and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

The invention claimed is:

1. A computer-implemented method for providing a Domain Name System (DNS) service, the method comprising:
   providing an agent of the DNS service for integration within an Internet Service Provider (ISP);
   receiving, at the agent of the DNS service, from the ISP, Internet Protocol (IP) allocation data associated with a subscriber IP address, the IP allocation data including a subscriber identifier and a unique identifier associated with an entry point device utilized by the subscriber device to connect to the DNS service, the IP allocation data being cached in an internal cache table associated with the agent of the DNS service, an update being provided to records of the DNS service when the subscriber IP address changes, the agent of the DNS service periodically checking the unique identifier associated with the entry point device at either each message event for the subscriber device or each time a network interface is displayed;
   associating the unique identifier with the subscriber identifier;
   dynamically mapping a subscriber device to an entry point device IP address; and
   providing the DNS service to the subscriber device based on a policy for the entry point device IP address.

2. The computer-implemented method of claim 1, wherein the IP allocation data is in a plurality of different formats.

3. The computer-implemented method of claim 1, wherein a subscriber is directed to a captive portal to facilitate collection of subscriber data.

4. The computer-implemented method of claim 1, wherein the entry point device is connected to the DNS via a wireless network.

5. The computer-implemented method of claim 1, wherein one or more entry point devices are associated with a home network.

6. The computer-implemented method of claim 1, wherein the ISP assigns IP information to the entry point device.

7. A subscriber Internet Protocol (IP) mapping and tracking system, the system comprising:
   an agent of a DNS service for integration within an Internet Service Provider (ISP);
   a communication module of the DNS service to receive, from the ISP, IP allocation data associated with a subscriber IP address, the IP allocation data further including a subscriber identifier and a unique identifier associated with an entry point device utilized by the subscriber device to connect to the DNS service, the IP allocation data being cached in an internal cache table associated with the agent of the DNS service, an update being provided to records of the DNS service when the subscriber IP address changes, the agent periodically checking the unique identifier associated with the entry point device at either each message event for the subscriber device or each time a network interface is displayed;
   a tracking module to associate the unique identifier with the subscriber identifier; and
   a mapping module to dynamically map a subscriber device to an entry point device IP address.

8. The system of claim 7, wherein the IP allocation data is in a plurality of different formats.

9. The system of claim 7, wherein a subscriber is directed to a captive portal to facilitate collection of subscriber data.

10. The system of claim 7, wherein the entry point device is connected to a Domain Name Server (DNS) via a wireless network.

11. The system of claim 7, wherein one or more entry point devices are associated with a home network.

12. The system of claim 7, wherein the ISP assigns IP information to the entry point device.

13. A non-transitory computer readable storage medium having a program embodied thereon, the program executable by a processor in a computing device to perform a method for providing a Domain Name System (DNS) service, the method comprising:
   providing an agent of the DNS service for integration within an Internet Service Provider (ISP);
   receiving, at the agent of the DNS service, from the ISP, Internet Protocol (IP) allocation data associated with a subscriber IP address, the IP allocation data including a subscriber identifier and a unique identifier associated with an entry point device utilized by the subscriber device to connect to the DNS service, the IP allocation data being cached in an internal cache table associated with the agent of the DNS service, an update being provided to records of the DNS service when the subscriber IP address changes, the agent periodically checking the unique identifier associated with the entry point device at either each message event for the subscriber device or each time a network interface is displayed;
   associating the unique identifier with the subscriber identifier;
   dynamically mapping a subscriber device to an entry point device IP address; and
   providing the DNS service to the subscriber device based on a policy for the entry point device IP address.

14. The non-transitory computer readable storage medium of claim 13, wherein the IP allocation data is in a plurality of different formats.

15. The non-transitory computer readable storage medium of claim 13, wherein a subscriber is directed to a captive portal to facilitate collection of subscriber data.

16. The non-transitory computer readable storage medium of claim 13, wherein the entry point device is connected to the DNS via a wireless network.

17. The non-transitory computer readable storage medium of claim 13, wherein one or more entry point devices are associated with a home network.

18. The non-transitory computer readable storage medium of claim 13, wherein the ISP assigns IP information to the entry point device.

* * * * *